US007739640B2

(12) United States Patent
Abbaspour et al.

(10) Patent No.: US 7,739,640 B2
(45) Date of Patent: Jun. 15, 2010

(54) METHOD AND APPARATUS FOR STATIC TIMING ANALYSIS IN THE PRESENCE OF A COUPLING EVENT AND PROCESS VARIATION

(75) Inventors: Soroush Abbaspour, Fishkill, NY (US); Gregory M. Schaeffer, Poughkeepsie, NY (US); Chandramouli Visweswariah, Croton-on-Hudson, NY (US)

(73) Assignee: International Business Machines Corporation, Armonk, NY (US)

( * ) Notice: Subject to any disclaimer, the term of this patent is extended or adjusted under 35 U.S.C. 154(b) by 553 days.

(21) Appl. No.: 11/622,979

(22) Filed: Jan. 12, 2007

(65) Prior Publication Data

US 2008/0172642 A1 Jul. 17, 2008

(51) Int. Cl.
*G06F 17/50* (2006.01)
(52) U.S. Cl. .................. 716/6; 716/4; 716/5
(58) Field of Classification Search .......... 716/4, 716/5, 6
See application file for complete search history.

(56) References Cited

U.S. PATENT DOCUMENTS

| 6,615,395 | B1 * | 9/2003 | Hathaway et al. ........... 716/6 |
| 7,111,260 | B2 * | 9/2006 | Visweswariah .............. 716/6 |
| 7,398,491 | B2 * | 7/2008 | Schaeffer et al. ............ 716/4 |
| 7,475,372 | B2 * | 1/2009 | Kashyap et al. ............. 716/6 |
| 2006/0059446 | A1 * | 3/2006 | Chen et al. ................. 716/6 |
| 2006/0150133 | A1 * | 7/2006 | Abbaspour et al. .......... 716/6 |

OTHER PUBLICATIONS

Sinha et al.,"A Unified Framework for Statistical Timing Analysis with Coupling and Multiple Input Switching", Nov. 2005, IEEE/ACM International Conference on Computer-Aided Design, Technical Digest pp. 837-843.*
Le et al.,"STAC: Statistical Timing Analysis wiith Correlation", 2004, IEEE, 41st Design Automation Conference, Proceedings pp. 343-348.*
Chen et al., "Miller Factor for Gate-Level Coupling Delay Calculation", Nov. 2000, IEEE/ACM International Conference on Computer Aided Design, Technical Digest, pp. 68-74.*
Kumar et al.,"A Probalistic Collation Method Based Statistical Gate Delay Model Considering Process Variation and Multiple Input Switching", 2005, IEEE, Design, Automation and Test in Europe Conference an Exhibition, Proceedings, vol. 2, pp. 770-775.*
Agarwal et al., "Statistical Gate Delay Model Considering Multiple Input Sw itching", 2004, IEEE 41st Design Automation Conference, Proceedings pp. 658-663.*

* cited by examiner

*Primary Examiner*—Sun J Lin

(57) ABSTRACT

In one embodiment, the invention is a method and apparatus for static timing analysis in the presence of a coupling event and process variation. One embodiment of a method for computing a statistical change in delay and slew due to a coupling event between two adjacent nets in an integrated circuit design includes conducting a statistical timing analysis of the integrated circuit design, computing a statistical overlap window between the adjacent nets, where the statistical timing window represents a period of time during which signals on the adjacent nets can switch contemporaneously and computing the statistical change of delay due to the coupling event, in accordance with the statistical overlap window.

18 Claims, 5 Drawing Sheets

METHOD AND APPARATUS FOR STATIC TIMING ANALYSIS IN THE PRESENCE OF A COUPLING EVENT AND PROCESS VARIATION

FIELD OF THE INVENTION

This invention generally relates to the field of Design Automation, and more particularly relates to statistical computation of the effects of coupling noise on static timing of integrated circuits.

BACKGROUND OF THE INVENTION

The primary goal of static timing analysis (STA) is to verify the timing correctness of integrated circuits. Conventional static timing analysis, however, does not take into account the effect of coupling noise on timing.

Coupling capacitance exists when two neighboring wires in an integrated circuit are in close proximity to each other. Depending on how the signals rise or fall on these wires, capacitive coupling can cause changes in the delays and slews (transition times) of gates and wires. For example, if the signals on the two neighboring wires are switching in the same direction (i.e., both rising or both falling), then the coupling capacitances between the two wires have their two terminal voltages moving in the same direction; hence the effective capacitance is reduced due to the so-called Miller effect, which causes the signals to speed up. Alternatively, if the two signals are switching in opposite directions, the effective capacitance is exacerbated, which can cause the signals to slow down. Taking into account these coupling effects is essential to correctly predict the timing characteristics of integrated circuits. With advanced technologies, coupling between wires is increasing, since the wires in modern integrated circuit technologies are taller and thinner than ever before, and high packing densities lead to wires that are closer to each other and to a larger number of on-chip interconnections.

Coupling in the form of interactions between adjacent wires causes disturbances that are not easily handled by a conventional static timing analysis. This is because static timing relies on levelization of the timing graph, whereas due to coupling, gates and wires at different level numbers can impact each others' delays and slews. Although some methods are known for analyzing coupling effects in STA, these prior-art methods do not take process variations into account.

With each new generation of integrated circuit technology, variability (e.g., due to process parameters, environmental parameters and aging effects, hereinafter collectively referred to as "process parameters") is proportionately increasing. To handle this increased variability in STA efficiently and with reduced pessimism compared to corner-based (or deterministic) timing methods, statistical timing is often used. Statistical timing analysis is static timing analysis that accounts for process variation; as used herein, the terms "static timing analysis", or simply "timing analysis", are understood to include statistical timing analysis.

Variations also impact coupling noise, and hence the change of timing characteristics due to coupling effects. Treating coupling effects in a corner-based fashion (i.e., conducting the timing analysis with coupling considerations at one or more chosen deterministic settings of all process parameters) is pessimistic as well as inefficient. Thus prior-art methods cannot accommodate both coupling events and process variations in an efficient or accurate manner.

FIG. 1, for example, is a schematic diagram illustrating an exemplary coupling event 100. As illustrated, first and second neighboring wires (or nets) 102a and 102b on a chip have coupling between them. A signal on the first wire 102a is driven by a first gate 104a and received by a second gate 106b. The second wire 102b is driven by a third gate 104b and received by a fourth gate 106b. When the signals driven through two neighboring wires, such as the first wire 102a and the second wire 102b, switch during the same time window, this is referred to as a coupling event.

The wire at which a signal is being analyzed for timing is referred to as the "victim," while the wire with which the victim experiences a coupling event is referred to as the "aggressor." Thus, for instance, if one is interested in the timing of the signal driven along the first wire 102a, then the first wire 102a is the victim, and the second wire 102b is the aggressor. The signal at the output of the first gate 104a is called the near-end victim signal and the signal at the input of the second gate 106a is called the far-end victim signal. Likewise, the signal at the output of the third gate 104b is called the near-end aggressor signal and the signal at the input of the receiver fourth gate 106b is called the far-end aggressor signal. If the signal driven through the aggressor switches contemporaneously and in the same direction as the signal driven through the victim, then the transmission of the signal on the victim will be sped up. Alternatively, if the signal driven through the aggressor switches contemporaneously and in the opposite direction of the signal driven through the victim, then the transmission of the signal through the victim will be slowed down.

FIG. 2 illustrates an electrical equivalent circuit 200 for the exemplary coupling event illustrated in FIG. 1. The first and second wires 102a and 102b have been modeled by resistance and capacitance (RC) parasitics, typically produced from the layout of the integrated circuit by an extraction program. The coupling capacitances are shown in bold lines. Four factors influence the change of delay due to a coupling event. The first factor is whether or not the two signals at the two terminals of any of the coupling capacitances overlap (i.e., can the signals transition contemporaneously or during the same window of time?), as well as the amount of time during which the signals can overlap. The second factor is the amount of coupling capacitance. The third factor is the transition time or slew of signals at the aggressor near-end, aggressor far-end, victim near-end and victim far-end. Finally, the fourth factor is the strength of the victim and the strength of the aggressor, which includes the sizes of the driving gates (e.g., first and third gates 104a and 104b) and the power supply voltage swings of the victim and aggressor driver gates (e.g., first and third gates 104a and 104b). In the face of process variations, all of these quantities are statistical in nature.

In reference to FIG. 2, several important drawbacks of deterministic timing and deterministic coupling analysis are described below. A first drawback is that predicting the worst-case corner (or setting of process parameters that produces the worst-case timing result) is not immediately obvious, since when process parameters vary, some of the factors described above make the coupling event worse, and some factors make it better. For example, suppose that, due to process variations, the victim driving gate strength is diminished. As a result of this variation, the victim near-end and far-end signals arrive later. One possible result is an overlapping time window between the victim and aggressor, which will make the coupling event worse. A different, but also possible, result is that there will no longer be an overlapping time window, which will make the coupling event better.

A second drawback is that using a worst-case analysis is needlessly pessimistic. For example, suppose again that, due to process variations, the victim driving gate strength is diminished. As a result, the victim near-end and far-end signals arrive later, and perhaps there will be no overlapping time window between the aggressor and victim. On the other hand, if the victim driving gate is stronger, the impact of the noise coupling event will be diminished, since the strong driving gate will drive the wire in a stronger fashion. A simple worst-case analysis will not take these correlations into account and will predict a needlessly pessimistic result.

A third drawback is that for a thorough analysis, several combinations of process variations must be analyzed. For example, weak and strong drivers, thin and thick metal layers, high and low voltage supplies, and all combinations thereof should be examined for a thorough analysis. Such an exhaustive analysis, however, is inefficient.

Thus, there is a need for a method and an apparatus for static timing analysis in the presence of a coupling event and process variation.

SUMMARY OF THE INVENTION

In one embodiment, the invention is a method and apparatus for static timing analysis in the presence of a coupling event and process variation. One embodiment of a method for computing a statistical change in delay due to a coupling event between two adjacent nets in an integrated circuit design includes conducting a statistical timing analysis of the integrated circuit design, computing a statistical overlap window between the adjacent nets, where the statistical timing window statistically represents a period of time during which signals on the adjacent nets can switch contemporaneously and computing the statistical change of delay due to the coupling event, in accordance with the statistical overlap window.

Accordingly, it is an object of the invention to perform a preliminary statistical timing analysis followed by a statistical determination of the change in delay due to process variation considering a coupling event. It is another object of the invention to determine the timing window overlap between neighboring nets statistically. It is yet another object of this invention to compute the sensitivity of the change in delay to the Miller factor, and the sensitivity of the Miller factor to all process parameters and to chain-rule these two sensitivities to express the change of delay in a parameterized statistical form. It is yet another object of this invention to similarly compute the change in slew and its sensitivities due to process variation considering a coupling event. It is a further object of this invention to propagate the change of delay and slew in a statistical fashion through a timing graph, and to iterate the computation of the change in delay and slew, and the propagation of the change in delay and slew.

These and other objectives are provided by the present invention. The invention increases the accuracy of performing a statistical timing analysis that includes coupling noise and reduces the pessimism as compared to conventional methods.

BRIEF DESCRIPTION OF THE DRAWINGS

The accompanying drawings, which are incorporated in and which constitute part of the specification, illustrate the presently preferred embodiments of the invention which, together with the general description given above and the detailed description of the preferred embodiments given below serve to explain the principles of the invention.

To facilitate understanding, identical reference numerals have been used, where possible, to designate identical elements that are common to the figures.

DETAILED DESCRIPTION

Figure 1:
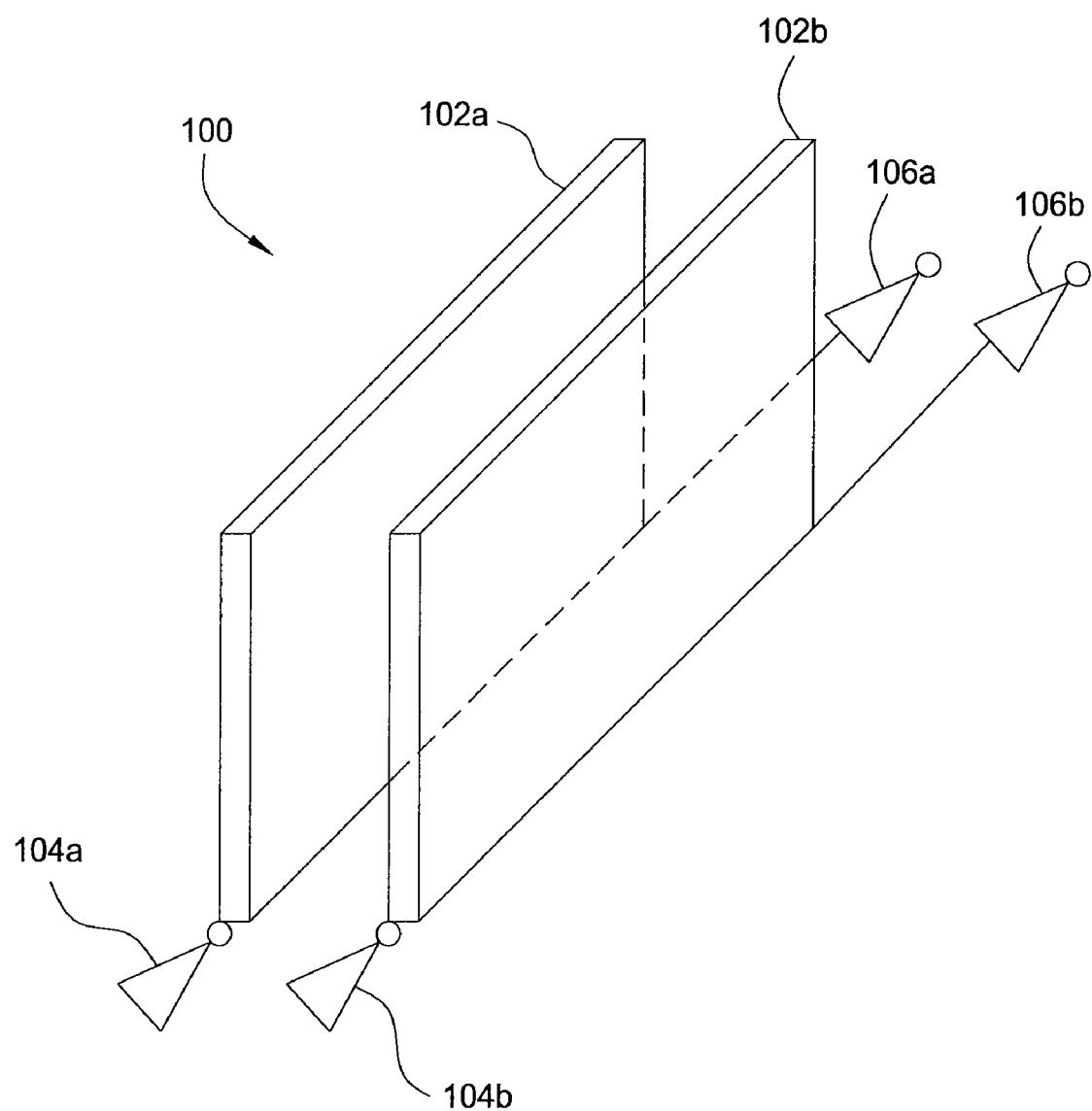
FIG. 1 is a schematic diagram illustrating an exemplary coupling event.
Figure 2:
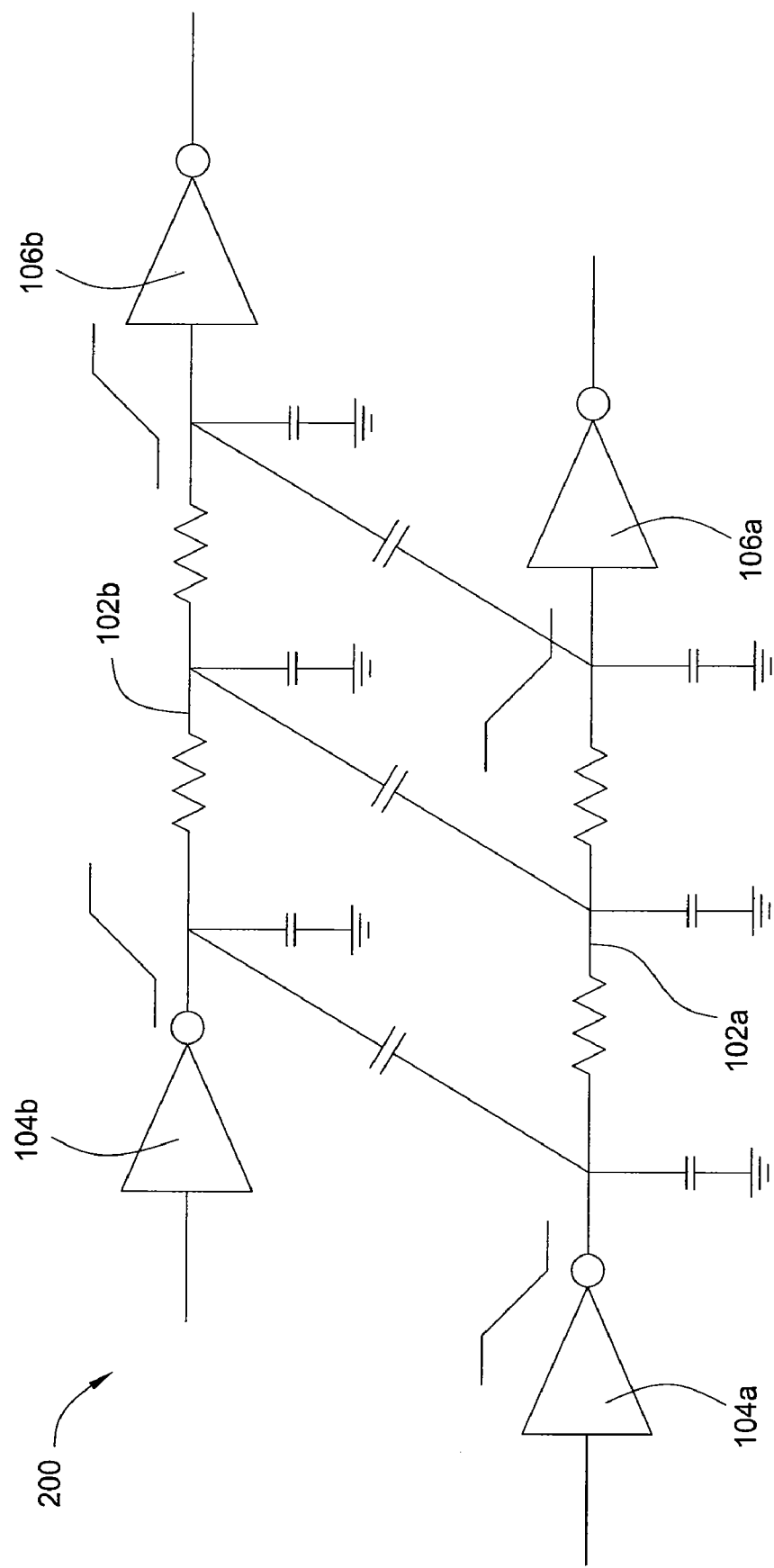
FIG. 2 illustrates an electrical equivalent circuit for the exemplary coupling event illustrated in FIG. 1.

The present invention and the various features and advantageous details thereof are explained with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the present invention in detail.

Figure 3:
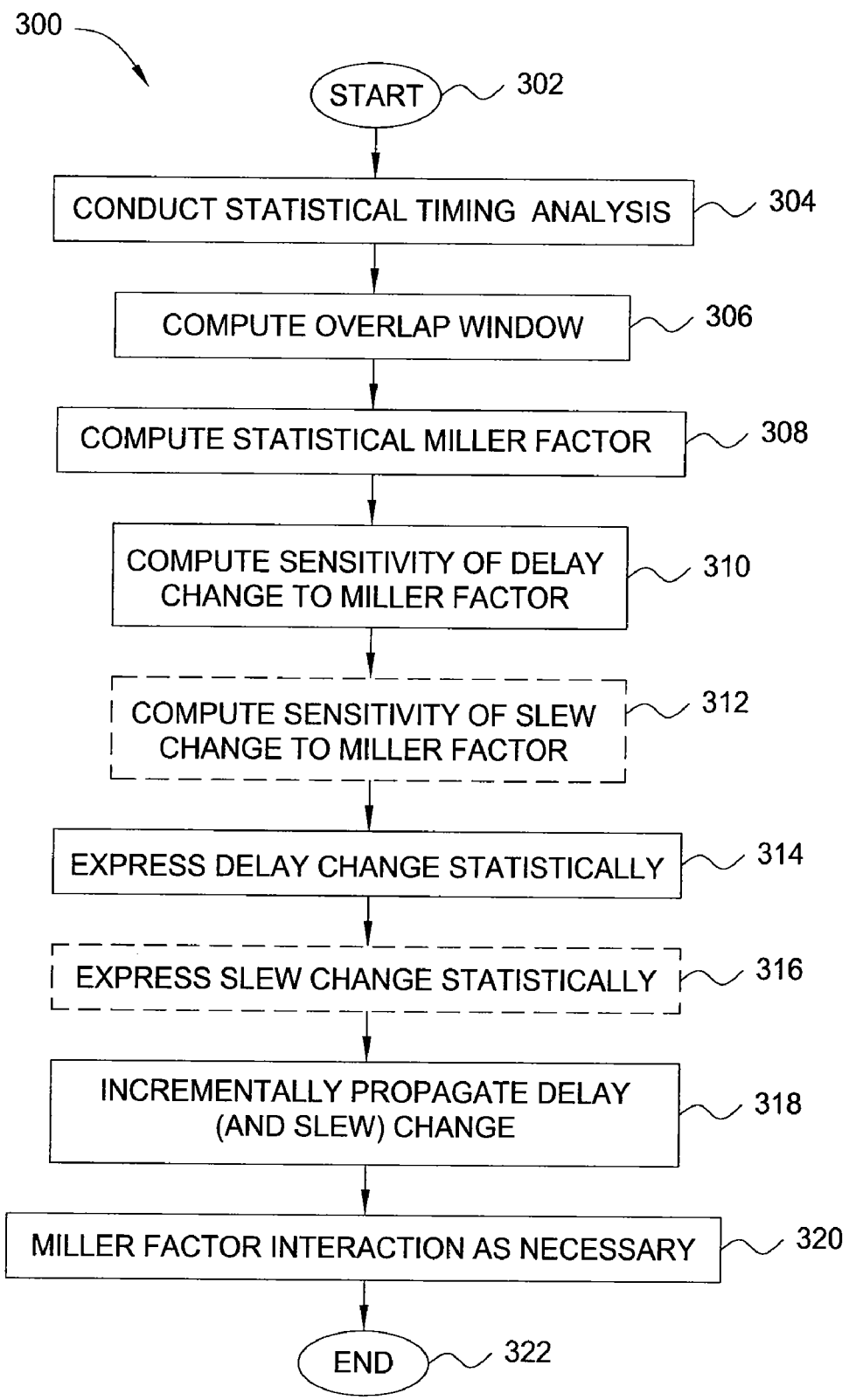
FIG. 3 is a flowchart illustrating one embodiment of a method for static timing analysis of an integrated circuit design, according to the present invention.

FIG. 3 is a flowchart illustrating one embodiment of a method 300 for static timing analysis of an integrated circuit design, according to the present invention. The method 300 may be implemented to analyze both combinational and sequential integrated circuit designs. As will be described in further detail below, the method 300 accurately and efficiently accounts for both process variations and coupling events during static timing analysis, while also taking into account the complex correlations induced by process variations.

The method 300 is initialized at step 302 and proceeds to step 304, where the method 300 conducts a noise-free statistical timing analysis of the integrated circuit design. In one embodiment, the statistical timing analysis is performed in accordance with any of one or more of a number of known methods for statistical timing analysis. As a result of the statistical timing analysis, a timing graph of the integrated circuit design is built. In addition, the early and late arrival time (AT) of every signal, the early and late slew of every signal, and the early and late required arrival time (RAT) of every signal is known as a probability distribution. These probability distributions are expressed in a form that is parameterized by the sources of variation in order to correctly preserve correlations between timing quantities. This parameterized form is referred to as a "canonical form," as described in U.S. patent application Ser. No. 10/665,092, filed Sep. 18, 2003 by Visweswariah, which is herein incorporated by reference in its entirety. Thus, the static timing analysis accounts for all possible process variations in the integrated circuit design.

Once the statistical timing analysis has been performed, the method 300 proceeds to step 306 and computes an overlap window for each pair of neighboring wires in the integrated circuit design. The overlap window is the duration of time during which a selected victim and the victim's corresponding aggressor could switch contemporaneously. Due to process variations, the near-end and far-end ATs are themselves probability distributions, and hence the overlap window is a probability distribution, too. One embodiment of a method for computing an overlap window is described in greater detail with respect to FIG. 4, which illustrates the computation of the timing window for a late mode falling transition on the victim.

In step 308, the method 300 computes statistical Miller factors, k, for early and late analysis of the overlap windows computed in step 306. The Miller factor is a well-known multiplicative factor applied to a coupling capacitance to exaggerate the coupling capacitance's effect in late mode or to diminish the coupling capacitance's effect in early mode timing. In one embodiment, the statistical Miller factor is computed in accordance with a dynamic noise simulation technique. In one embodiment, the statistical Miller factor is computed in accordance with the same technique used for deterministic timing, but substituting statistical operations for deterministic algebraic operations. One example of this technique is shown in the equations below:

$$\text{Late mode } k = \quad \text{(EQN. 1)}$$
$$1.0 + \frac{\min(Ov, Ta, Tv)}{Ta} * \min\left(2.0, \frac{Tv}{\min(Ov, Ta, Tv)}\right) * \frac{Vdd(A)}{Vdd(V)}$$

$$\text{Early mode } k = \quad \text{(EQN. 2)}$$
$$1.0 - \frac{\min(Ov, Ta, Tv)}{Ta} * \min\left(2.0, \frac{Tv}{\min(Ov, Ta, Tv)}\right) * \frac{Vdd(A)}{Vdd(V)}$$

wherein:
Ta represents the early near-end aggressor transition time or slew;
Tv represents the late far-end victim transition time or slew;
Ov represents the amount of overlap between the switching windows of the victim and aggressor, in a canonical form as computed in step 306;
Vdd(A) represents the voltage swing (voltage difference between power supply and ground signals) of the aggressor driver cell; and
Vdd(V) represents the voltage swing (voltage difference between power supply and ground signals) of the victim driver cell.

The magnitude of the calculated Miller factor reflects the amount of coupling noise impact on timing; factors close to 1.0 imply little impact, whereas factors further away from 1.0 imply a larger impact.

The various slews $T_a$ and $T_v$ in EQNs. 1 and 2 are picked up in canonical form from the initial statistical timing analysis (i.e., step 304). The various algebraic operations are performed statistically to obtain the Miller factors in statistical canonical form. It is to be noted that Miller factors can be computed in various ways, and the equations above represent just one example of how the Miller factors may be computed. By replacing deterministic operations with statistical operations, appropriate statistical Miller factors can be computed as a statistical counterpart corresponding to any deterministic technique.

Once the Miller factors are computed, the method 300 proceeds to step 310 and computes the sensitivity of the change in delay to the Miller factor. In one embodiment, this sensitivity computation is performed in accordance with the methods described in U.S. patent application Ser. No. 11/420,529, filed May 25, 2006 by Schaeffer et al, which is herein incorporated by reference in its entirety. In optional step 312 (illustrated in phantom), the method 300 additionally computes the sensitivity of the change in slew to the Miller factor. Treating slew changes statistically improves the accuracy of the method 300.

In step 314, the method 300 expresses the change of delay due to the coupling event in statistical canonical form. In one embodiment, the method 300 computes separate rise and fall statistical changes of delay due to the coupling event. In one embodiment, expression of the delay change is accomplished using a chain-ruling process. Since the sensitivity of the change in delay to the Miller factor is known (i.e., from step 310), and the sensitivity of the Miller factor to each process parameter is also known (i.e., from step 308, by computing the Miller factor in canonical form), these sensitivities are chain-ruled as shown below to obtain the change in delay in statistical canonical form:

$$\Delta delay = \Delta delay_0 + \sum_{i=1}^{n} \frac{\partial \Delta delay}{\partial p_i} \Delta p_i \quad \text{(EQN. 3)}$$

$$\frac{\partial \Delta delay}{\partial p_i} = \frac{\partial \Delta delay}{\partial k} \frac{\partial k}{\partial p_i} \quad \text{(EQN. 4)}$$

where $\Delta$delay is the change of delay due to the coupling event $\Delta$delay$_0$ is the change of delay due to the coupling event in the absence of variations, $p_i$ are the process variables, and k is the Miller factor. In EQN. 4, the first term on the right-hand side is obtained from step 310, and the second term is obtained from step 308. In optional step 316 (illustrated in phantom), a similar chain-rule calculation is carried out using slews to obtain the change in slew in statistical canonical form.

In step 318, the method 300 incrementally propagates the change in delay (and optionally slew) due to the coupling event in statistical form through the timing graph built in step 304. In one embodiment, propagation of the delay and slew change is accomplished according to the methods described in U.S. Pat. No. 7,111,260, which is herein incorporated by reference in its entirety.

In step 320, the method 300 iterates steps 306-318 as necessary. Analysis of coupling noise on timing is a "chicken and egg" problem. The changes in delay and slew due to coupling events are not known until the correct timing window overlaps are known. Likewise, the correct timing window overlaps are not known until the correct arrival times and slews are known. Finally, the correct arrival times and slews are not known until the changes in delays and slews due to coupling events are known. One embodiment of an iterative procedure that may be implemented in accordance with step 320 is described in further detail in U.S. Pat. No. 6,615,395, which is herein incorporated by reference in its entirety.

Figure 4:
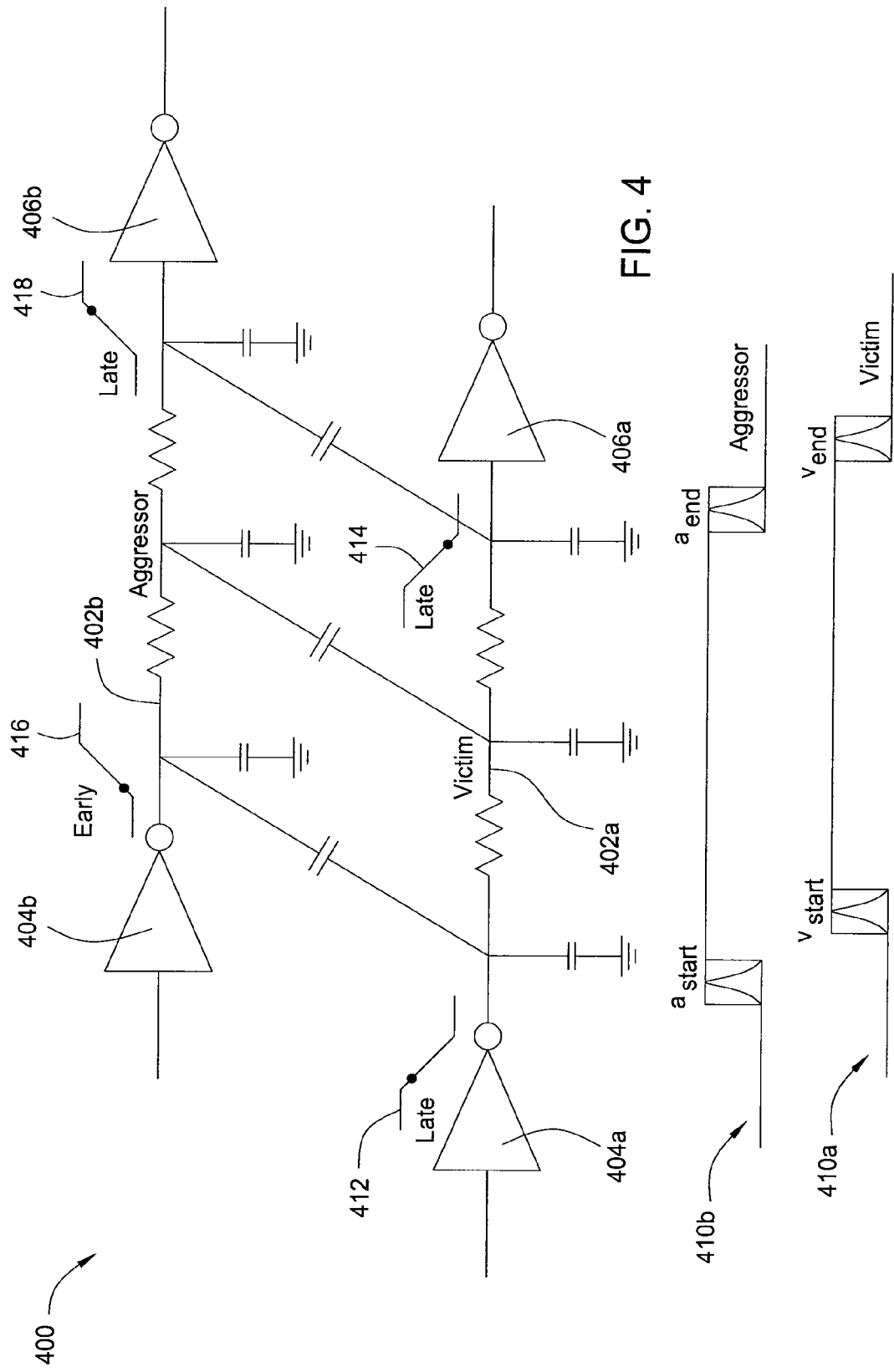
FIG. 4 illustrates an exemplary electrical equivalent circuit and corresponding switching windows for victim and aggressor wires in an integrated circuit design.

FIG. 4 illustrates an exemplary electrical equivalent circuit 400 and corresponding switching windows 410a and 410b, respectively, for victim and aggressor wires (402a and 402b, respectively) in an integrated circuit design. In particular, FIG. 4 illustrates one embodiment of a method for computing an overlap window, for example in accordance with step 306 of the method 300.

In deterministic analysis, the switching window 410a of the victim signal (i.e., the signal on the victim wire 402a) is typically defined as the start of the late falling transition at the near-end (denoted by reference numeral 412) to the end of the late falling transition at the far-end (denoted by reference numeral 414) (i.e., the window of time during which any part of the victim signal may be transitioning in late mode). If a late mode analysis is assumed, the aggressor signal (i.e., the signal on the aggressor wire 402b) switches in the opposite direction, in order to slow down the victim signal as much as possible. The aggressor switching window 410b is defined as the entire window during which the aggressor signal could possibly switch, i.e., the start of the early rising near-end signal (denoted by reference numeral 416) to the end of the late rising far-end signal (denoted by reference numeral 418), as shown in FIG. 4. While this computation is simple in deterministic timing, the complication that arises in statistical timing is that the arrival times and slews are statistical and correlated with each other.

Referring to the victim switching window 410a and the aggressor switching window 410b, the start and end of the aggressor switching window 410b are defined as $a_{start}$ and $a_{end}$, respectively. The start and end of the victim switching window 410a are defined as $v_{start}$ and $v_{end}$, respectively. The values of $a_{start}$, $a_{end}$, $v_{start}$ and $v_{end}$ are typically linear combinations of an AT and a slew. For example, $a_{start}$ may be defined as the arrival time of the aggressor signal minus half the slew of the aggressor signal. In one embodiment, for statistical timing window overlap computation, $a_{start}$, $a_{end}$, $v_{start}$, and $v_{end}$ are computed statistically from the statistical (canonical) forms of the corresponding ATs and slews. Once this is done, the following simple formula is used to compute the statistical overlap window:

$$\text{Overlap} = \max[0, \min(a_{end}, v_{end}) - \max(a_{start}, v_{start})] \quad \text{(EQN. 5)}$$

The "min," "max," and subtraction operations are conducted statistically as in statistical STA. EQN. 5 simply says that min ($a_{end}$, $v_{end}$) is the right edge of the overlap window (which is a probability distribution), that max ($a_{start}$, $v_{start}$) is the left edge of the overlap window (which is a probability distribution) and that the difference between these right edge and the left edge is the statistical overlap window, provided the difference is positive.

It should be noted that various definitions of switching windows are possible and that various methods of computing overlap windows may be used without deviating from the scope of the present invention. In all cases, the switching windows are computed statistically by replacing ATs and slews with statistical distributions, and by using statistical operations like addition, subtraction, scaling, and "min" and "max" operations. Also, the definition of switching windows may be different for early and late computation purposes. Thus one of ordinary skill in the art will be able to modify the inventive technique to a wide variety of switching and overlap window definitions.

It is to be further understood that many variants of the present invention can be proposed and implemented by one of ordinary skill in the art, including different ways of computing statistical Miller coefficients, different ways of computing overlap windows, different ways of computing the sensitivity of Miller coefficients to process parameters, and different ways of solving the "chicken and egg" iteration problem (i.e., as described with respect to step 320 of the method 300). Moreover, several of the steps in FIG. 3 can be reverted to their deterministic equivalents for simplicity.

In addition, the approach described herein can be extended to enable a statistical treatment of delays and slews in other methods. For example, one could perform a dynamic simulation to compute the noise pulse injected by the aggressor net into the victim net, and using the size (width and peak) of that noise pulse to compute the change in delay and slew due to capacitive coupling. This impact depends on the same factors as previously described, and these factors can be represented statistically. One embodiment of a method for taking a noise pulse, and using it to compute a Miller factor, is described in U.S. patent application Ser. No. 11/160,701, filed Jun. 20, 2005 by Kashyap et al., which is hereby incorporated by reference in its entirety. This method can be extended to compute a Miller factor statistically by one of ordinary skill in the art, e.g., in accordance with step 308 of the method 300. The change in delay and slew due to coupling can then be computed statistically, and propagated statistically as previously described herein.

Figure 5:
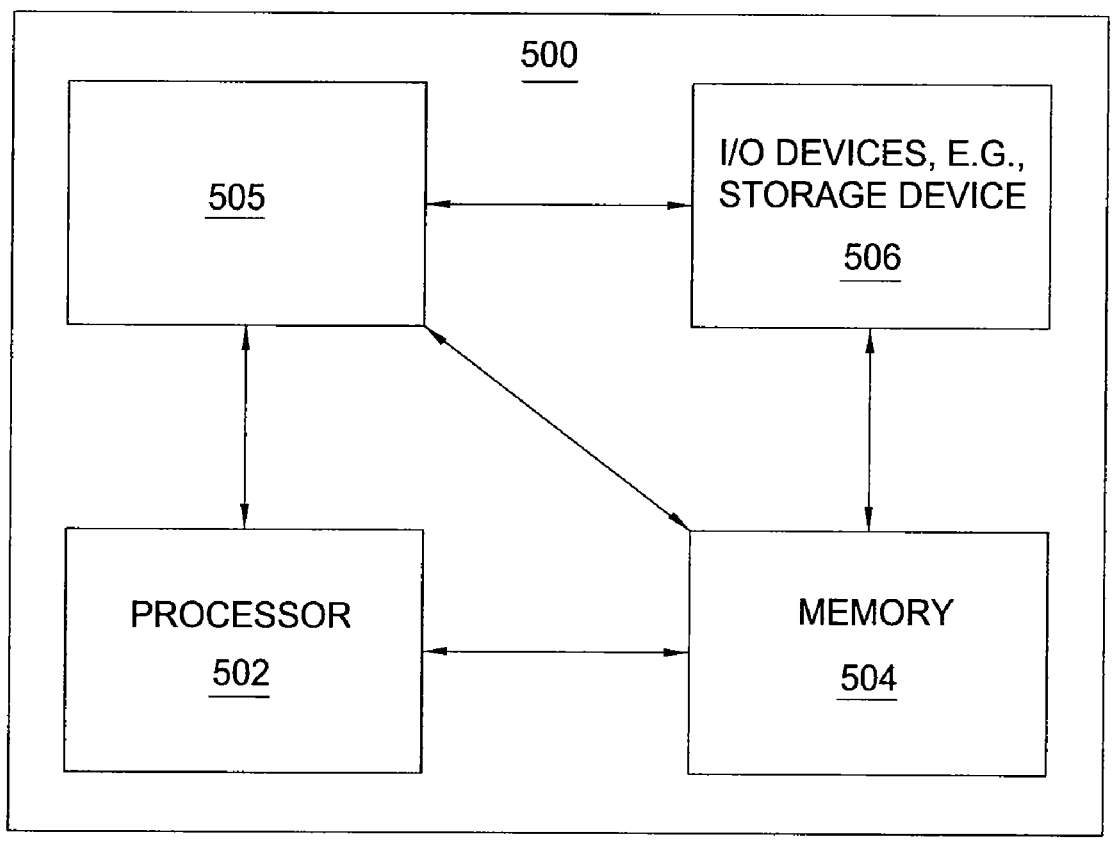
FIG. 5 is a high level block diagram of the static timing analysis method that is implemented using a general purpose computing device.

FIG. 5 is a high level block diagram of the static timing analysis method that is implemented using a general purpose computing device 500. In one embodiment, a general purpose computing device 500 comprises a processor 502, a memory 504, a timing analysis module 505 and various input/output (I/O) devices 506 such as a display, a keyboard, a mouse, a modem, and the like. In one embodiment, at least one I/O device is a storage device (e.g., a disk drive, an optical disk drive, a floppy disk drive). It should be understood that the timing analysis module 505 can be implemented as a physical device or subsystem that is coupled to a processor through a communication channel.

Alternatively, the timing analysis module 505 can be represented by one or more software applications (or even a combination of software and hardware, e.g., using Application Specific Integrated Circuits (ASIC), Field Programmable Gate Arrays (FPGAs) or Digital Signal Processors (DSPs)), where the software is loaded from a storage medium (e.g., I/O devices 506) and operated by the processor 502 in the memory 504 of the general purpose computing device 500. Thus, in one embodiment, the timing analysis module 505 for static timing analysis in the presence of coupling events and process variations described herein with reference to the preceding Figures can be stored on a computer readable medium or carrier (e.g., RAM, magnetic or optical drive or diskette, and the like).

Thus, the present invention represents a significant advancement in the field of Design Automation. Embodiments of the present invention enable static timing analysis of an integrated circuit design to be performed in the presence of both coupling events and process variations. The accuracy of the static timing analysis is thus improved and pessimism is reduced as compared to conventional static timing analysis approaches.

While foregoing is directed to the preferred embodiment of the present invention, other and further embodiments of the invention may be devised without departing from the basic scope thereof, and the scope thereof is determined by the claims that follow.

The invention claimed is:

1. A method for computing a statistical change of delay due to a coupling event between two adjacent nets in an integrated circuit design, comprising:

conducting a statistical timing analysis of the integrated circuit design;

computing a statistical overlap window between the two adjacent nets, the statistical overlap window representing a period of time during which signals on the two adjacent nets can switch contemporaneously; and computing the statistical change of delay due to the coupling event, in accordance with the statistical overlap window, wherein the computing the statistical change of delay comprises:

computing a statistical Miller factor to represent an impact of capacitive coupling on delay;

computing a sensitivity of the statistical change of delay to the statistical Miller factor;

computing a sensitivity of the statistical Miller factor to a process parameter of the integrated circuit design; and chain-ruling the sensitivity of the statistical change of delay and the sensitivity of the statistical Miller factor to obtain the statistical change of delay due to the coupling event, wherein at least one of: the conducting the statistical timing analysis, the computing the statistical overlap window, or the computing the statistical change of delay is performed using a processor.

2. The method of claim 1, further comprising:
computing separate rise and fall statistical changes of delay due to the coupling event.

3. The method of claim 1, wherein the statistical Miller factor is computed in accordance with a dynamic noise simulation technique.

4. The method of claim 1, wherein the sensitivity of the statistical change of delay to the statistical Miller factor is computed using deterministic timing.

5. The method of claim 1, wherein the statistical Miller factor is computed using deterministic timing.

6. The method of claim 1, further comprising:
propagating the statistical change of delay due to the coupling event through a timing graph of the integrated circuit design.

7. The method of claim 1, further comprising:
repeating the conducting the statistical timing analysis using the statistical change of delay due to the coupling event as an input; and
repeating the computing the statistical change of delay in accordance with the statistical timing analysis, as repeated.

8. The method of claim 1, wherein the integrated circuit design is a combinational integrated circuit design.

9. The method of claim 1, wherein the integrated circuit design is a sequential integrated circuit design.

10. The method of claim 1, further comprising:
computing a statistical change of slew due to the coupling event.

11. The method of claim 10, further comprising:
computing a statistical Miller factor to represent an impact of capacitive coupling on slew;
computing a sensitivity of the statistical change of slew to the statistical Miller factor;
computing a sensitivity of the statistical Miller factor to a process parameter of the integrated circuit; and
chain-ruling the sensitivity of the statistical change of slew and the sensitivity of the statistical Miller factor to obtain the statistical change of slew due to the coupling event.

12. The method of claim 11, further comprising:
computing separate early and late statistical changes of slew due to the coupling event.

13. The method of claim 11, wherein the sensitivity of the statistical change of slew to the statistical Miller factor is computed using deterministic timing.

14. The method of claim 10, further comprising:
propagating the statistical change of slew due to the coupling event through a timing graph of the integrated circuit.

15. A computer readable storage medium containing an to be executed by a processor for computing a statistical change of delay and slew due to a coupling event between two adjacent nets in an integrated circuit design, where the program performs steps of:
conducting a statistical timing analysis of the integrated circuit design;
computing a statistical overlap window between the two adjacent nets, the statistical overlap window representing a period of time during which signals on the two adjacent nets can switch contemporaneously; and
computing the statistical change of delay due to the coupling event, in accordance with the statistical overlap window, wherein the computing the statistical change of delay comprises:
computing a statistical Miller factor to represent an impact of capacitive coupling on delay;
computing a sensitivity of the statistical change of delay to the statistical Miller factor;
computing a sensitivity of the statistical Miller factor to a process parameter of the integrated circuit design; and
chain-ruling the sensitivity of the statistical change of delay and the sensitivity of the statistical Miller factor to obtain a statistical change of delay due to the coupling event.

16. The computer readable storage medium of claim 15, further comprising:
repeating the conducting the statistical timing analysis using the statistical change of delay due to the coupling event as an input; and
repeating the computing the statistical change of delay in accordance with the statistical timing analysis, as repeated.

17. The computer readable storage medium of claim 15, further comprising:
computing a statistical change of slew due to the coupling event.

18. A system for computing a statistical change of delay and slew due to a coupling event between two adjacent nets in an integrated circuit design, comprising:
means for conducting a statistical timing analysis of the integrated circuit design;
means for computing a statistical overlap window between the two adjacent nets, the statistical overlap window representing a period of time during which signals on the two adjacent nets can switch contemporaneously; and
means for computing the statistical change of delay due to the coupling event, in accordance with the statistical overlap window, wherein the means for computing the statistical change of delay comprises:
means for computing a statistical Miller factor to represent an impact of capacitive coupling on delay;
means for computing a sensitivity of the statistical change of delay to the statistical Miller factor;
means for computing a sensitivity of the statistical Miller factor to a process parameter of the integrated circuit design; and
means for chain-ruling the sensitivity of the statistical change of delay and the sensitivity of the statistical Miller factor to obtain the statistical change of delay due to the coupling event.

* * * * *